United States Patent [19]
Pitto

[11] 3,911,754
[45] Oct. 14, 1975

[54] CONTROL DEVICE OF AN OSCILLATING ELEMENT OF A MACHINE-TOOL

[75] Inventor: Yves-Michel Pitto, Geneva, Switzerland

[73] Assignee: Tarex-Manurhin S.A. Fabrique de Machines, Geneva, Switzerland

[22] Filed: Feb. 1, 1974

[21] Appl. No.: 438,787

[30] Foreign Application Priority Data
Feb. 7, 1973   Switzerland.................. 1720/73

[52] U.S. Cl. .................. 74/102; 74/103; 74/104; 74/107; 74/568 R
[51] Int. Cl.² ........................................ F16H 25/14
[58] Field of Search .......... 74/25, 27, 53, 104, 103, 74/102, 567, 568 R, 569, 107

[56] References Cited
UNITED STATES PATENTS
3,084,800   4/1963   Baxter............................. 74/104 X
3,094,086   6/1963   Meier............................... 74/567 X
3,263,511   8/1966   Wellstein......................... 74/102 X

*Primary Examiner*—Samuel Scott
*Assistant Examiner*—F. D. Shoemaker
*Attorney, Agent, or Firm*—Silverman & Cass, Ltd.

[57] ABSTRACT

A control device for a loading arm of a machine tool includes a cam coupled to the loading arm for moving the arm into two positions. A piston is also provided which is in communication with the loading arm and the cam. The piston maintains the arm in communication with the cam in the two noted positions and moves the arm out of communication with the cam and into a third position.

3 Claims, 1 Drawing Figure

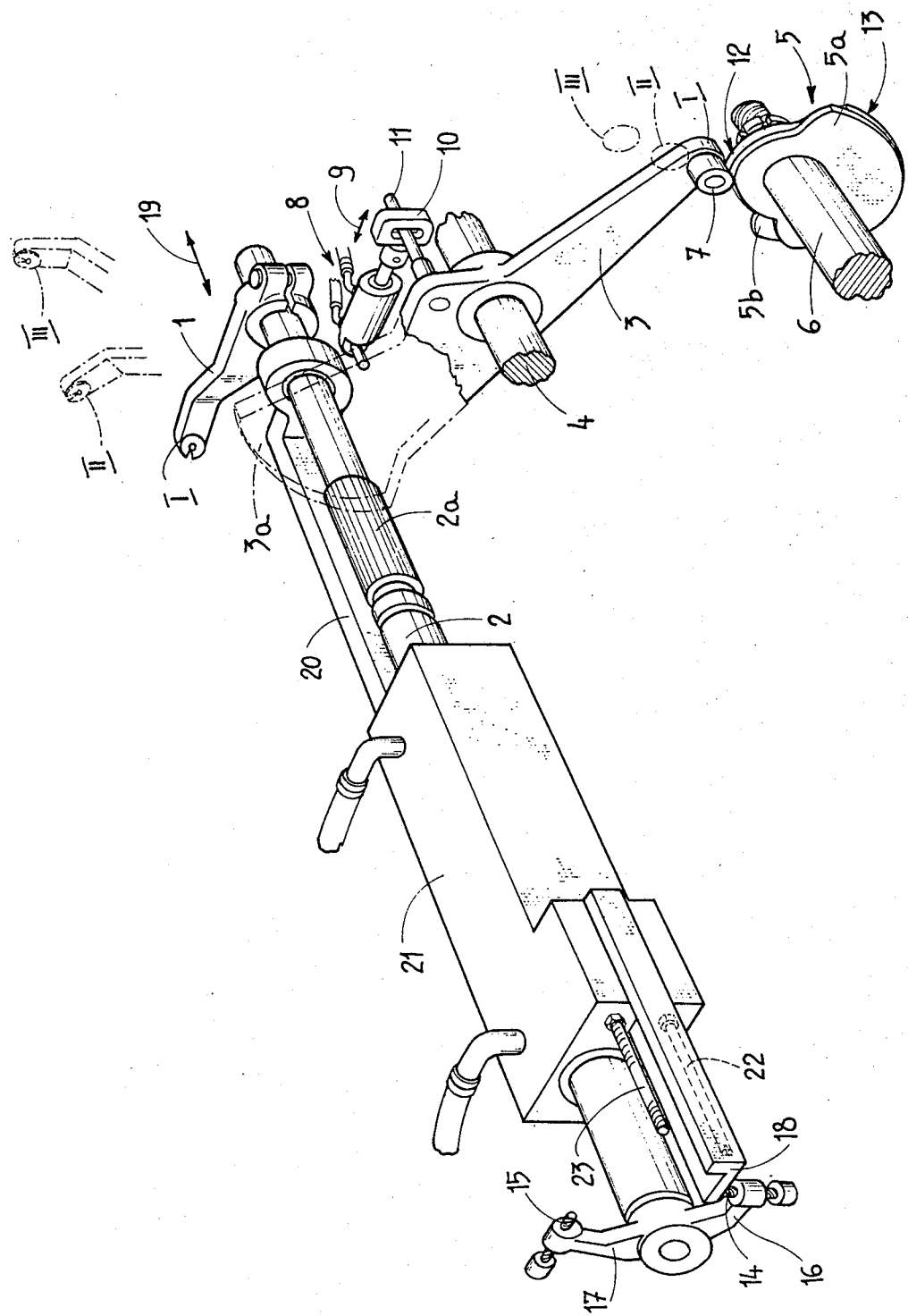

CONTROL DEVICE OF AN OSCILLATING ELEMENT OF A MACHINE-TOOL

The present invention relates to a control device of an oscillating element of a machine-tool, especially of a loading arm, having to occupy at least three angular positions.

The control of an element of machine-tool such as a loading arm, having to occupy three positions, for instance an intermediary position, of rest, and two extreme positions, of work, can easily be carried out by means of a stage cam. However, such a cam must be designed from case to case according to the times desired during which the element to be controlled must occupy each of its three positions and according to the speed of rotation of the cam. Moreover, the manufacture of such a cam must be precise and generally needs adjustments which are long and expensive since each of them can be carried on only after the cam has been mounted on the machine and a test has been made.

The purpose of the present invention is to furnish a control means which is more simple, needing only a two stage cam, the precision of which has not to be very high since this cam brings the movable element only from its rest position into one of its working positions.

The control device according to the invention is characterized by the fact that it comprises on the one hand a cam acting, at least indirectly, on the said element for bringing it into two of its positions, that is to say one of its extreme positions, and into its intermediary position, and on the other hand a fluid operating or electromagnetic device acting at least indirectly on the said element on the one hand for maintaining it applied against the said cam when it has to occupy one or the other of the two positions determined by this cam, and on the other hand for bringing this element to leave the said cam and to occupy its third position which is one of the extreme ones.

The drawing shows, by way of example, one embodiment of the subject of the invention.

The sole FIGURE is a diagrammatic perspective view of the control device of a loading arm of a machinetool.

The loading arm represented, designated by 1, is force fitted on an oscillating arm 2 a portion 2a of which is toothed and meshes with a toothed sector 3a provided on one of the arms of a two arm control lever 3 articulated at 4 on the frame of the machine. The loading arm 1 must be able to occupy the three positions indicated by I, II and III in the drawing and which correspond to the three positions of the lever 3 indicated the same way. The extreme positions I and III of the arm 1 are working positions while its intermediary position II is a rest position. The displacement of the control lever 3 is controlled in part by a cam, generally designated by 5, which is forced fitted on a rotatable shaft 6, and which acts on a roller 7 carried by the lever 3, and in part by a double action hydraulic piston, generally designated by 8, which produces a displacement, in the direction of the arrow 9, of a yoke 10. A stem 11 carried by the lever 3 passes through yoke 10. The piston 8 can be replaced by a pneumatic or also by an electromagnetic device.

The cam 5 is constituted by two sectors or sections 5a and 5b having each two stages or portions, the adjustment of the relative angular position of the two sections with respect to one another thereby permitting modification of the lengths of the two stages provided together by the said two sectors.

When the loading arm 1 has to occupy one or the other of its positions I and II, the piston 8 pushes the yoke 10 forward, urging stem 11, and lever 3 to rotate in the clockwise direction and the roller 7 to be applied against the cam 5. When the portion 12 of the cam, of smaller radius, that is to say its recess, cooperates with the roller 7, in the position represented in the drawing, the lever 3 and consequently the loading arm 1 both occupy the position I.

When, during the rotation of the cam 5, the portion 13 of the cam, of greater radius, bears against roller 7, the lever 3 and the loading arm 1 are brought into the intermediary position II, of rest.

When the loading arm 1 has to occupy its working position III, the piston 8 draws the yoke 10 towards piston 8 drawing stem 11 along and causing the lever 3 to rotate in the counter-clockwise direction, so that the roller 7 leaves the surface of cam 5.

The operating cycle of the device is the following:

From the rest position II of the loading arm 1, in which, pushed by the piston 8, the control lever 3 has its roller 7 bearing on the portion 13 of the cam 5, the rotation of the cam brings portion 12 into cooperation with the roller 7, thus urging the loading arm 1 into its first working position I.

Before the whole portion 12 of the cam 5 has passed opposite the roller 7, the piston 8, draws the yoke toward it pivoting the lever 3 and, separating the roller 7 from the cam 5, and thus bringing the loading arm 1 into its second working position III.

Once the functions that the loading arm must carry out when it occupies its working position III are executed, the piston 8 pushes the yoke 10, causing the lever 3 to pivot in the clockwise-direction. It is necessary that, in the meantime, the portion 13 of the cam 5 returns opposite the roller 7 so that, at the end of its back displacement, the arm 1 stops in its rest position II.

Thus, it is not the profile of the cam which determines the moment at which the loading arm passes from the first one to the second one of its two working positions, but control blocks operating the piston 8, for instance by means of an electro-valve. It is sufficient therefore that the portion 12 of the cam 5 be sufficiently long so that the piston operates before the portion 13 comes in service. The length of the portion 12 is however limited by the fact that this portion must use a less time to pass opposite the roller 7 than the time during which the loading arm 1 must remain in its two positions II and III.

It is to be noted that, in the extreme positions I and III of the loading arm 1, adjustable abutting members 14 and 15 carried by two arms 16 and 17, respectively, which are rigidly secured to the control arm 2, are respectively bearing against one or the other of the faces of a stationary abutting small stop 18.

Moreover, beside its pivoting movements, the loading arm 1 must be able in order to carry out the loading operations for which it is designed, to effect a translation movement in the direction of the arrow 19. To this effect, the shaft 2 carrying the arm 1 is longitudinally movably mounted in its cradle 20. Its longitudinal displacements are controlled hydraulically by a jack 21. The longitudinal positions of the shaft 2, in the positions I and III respectively, of the arm are determined by the stopping of the arm 16 against a stationary stop 22 or by the stopping of the arm 17 against a stationary stop 23, these two abutments being adjustable.

In the embodiment disclosed and represented, the cam 5 acts indirectly on the loading arm 1, through the intermediary of the control lever 3 but, as a modification, the cam could act directly on the loading arm. The same remark is true so far as the piston 8 is concerned, which, in the embodiment disclosed and represented acts indirectly on the loading arm 1, through the intermediary of the control lever 3, but which could act directly on the loading arm. In other words, the arrangement could be modified in such a way that the control arm 3 could constitute itself the loading arm.

What I claim is:

1. A control device for an oscillating element of a machine tool, such as a loading arm, which has to occupy at least three angular positions, including in combination, a cam having first and second portions thereon, said cam being coupled to said element for moving same into two of said angular positions, piston means coupled to said element for maintaining said element against said cam portions when in said two positions, and for moving said element away from said cam to said third position.

2. The control device as claimed in claim 1 wherein said cam includes two sections each having two portions, the angular relative positions of said two sections determining the lengths of said two portions.

3. The control device as claimed in claim 1 wherein said three angular positions include two extreme positions and an intermediate position and further including stop means for stopping said element in said two extreme positions.

* * * * *